United States Patent [19]

Narang

[11] Patent Number: 4,987,881
[45] Date of Patent: Jan. 29, 1991

[54] FUEL BURNING FURNACE

[76] Inventor: Rajendra K. Narang, 1525 Bonnie Rd., Macedonia, Ohio 44056

[21] Appl. No.: 494,589

[22] Filed: Mar. 16, 1990

Related U.S. Application Data

[60] Division of Ser. No. 366,262, Jun. 12, 1989, Pat. No. 4,922,890, which is a continuation of Ser. No. 428,542, Sep. 30, 1982, abandoned.

[51] Int. Cl.⁵ .............................................. F24H 3/02
[52] U.S. Cl. .............................. 126/110 R; 126/113; 126/117; 165/170; 165/82; 236/DIG. 2; 236/DIG. 3; 116/DIG. 25
[58] Field of Search ............ 62/92, 93; 116/DIG. 25; 126/990, 110 R, 113, 117; 137/599; 165/82, 165, 170; 236/10, 11, DIG. 2, DIG.3; 431/42

[56] References Cited

U.S. PATENT DOCUMENTS

| | | | |
|---|---|---|---|
| 17,998 | 3/1931 | Fleisher | 62/92 |
| 675,981 | 6/1901 | Seifert | 126/117 |
| 1,004,468 | 7/1911 | Reynolds et al. | 62/93 |
| 1,151,611 | 8/1915 | Prat | 126/110 R |
| 1,862,219 | 6/1932 | Harrison | 126/99 D |
| 1,887,242 | 11/1932 | Martinson | 126/113 |
| 1,939,602 | 12/1933 | Suppes | 126/110 R |
| 2,022,394 | 11/1935 | Weyl | 126/113 |
| 2,032,553 | 3/1936 | Spoelstra | 126/110 R |
| 2,053,590 | 9/1936 | Whiteley | 126/110 R |
| 2,210,976 | 8/1940 | Hallinan | 236/10 |
| 2,214,269 | 9/1940 | Bryant | 126/116 |
| 2,223,283 | 11/1940 | Grant et al. | 236/10 |
| 2,264,974 | 12/1941 | Hallinan | 474/22 |
| 2,315,412 | 3/1943 | Galumbeck | 431/60 |
| 2,369,044 | 2/1945 | Hallinan | 126/110 R |
| 2,808,047 | 5/1956 | Jaye et al. | 126/110 R |
| 2,884,048 | 7/1959 | Marble et al. | 126/110 R |
| 3,022,987 | 2/1962 | Thorsheim | 126/110 R |
| 3,105,485 | 10/1963 | Lucas | 126/110 R |
| 3,119,887 | 1/1964 | Baehr | 126/113 |
| 3,211,437 | 10/1965 | Jaye | 126/113 |
| 3,212,288 | 10/1965 | Herbert | 62/290 |
| 3,228,461 | 1/1966 | Seekins | 165/81 |
| 3,241,544 | 3/1966 | Lohman | 126/110 B |
| 3,352,126 | 11/1967 | Beshekas | 62/290 |
| 3,369,751 | 2/1968 | Howe | 236/11 |
| 3,489,345 | 1/1970 | Moreland | 236/11 |
| 3,509,867 | 5/1970 | Brosens et al. | 165/165 |
| 3,627,035 | 12/1971 | Astrup | 165/82 |
| 4,014,209 | 3/1977 | Emerick | 116/DIG. 25 |
| 4,349,148 | 9/1982 | Liberto et al. | 236/11 |
| 4,374,785 | 2/1983 | Wyatt | 137/599 |

FOREIGN PATENT DOCUMENTS

| | | | |
|---|---|---|---|
| 658844 | 3/1963 | Canada | 126/110 R |
| 567223 | 2/1924 | France | 165/170 |

OTHER PUBLICATIONS

Sears, "Direct Spark Ignition Furnace", Brochure, Oct. 1978, RF42-87549, #80136.
Lennox, "Conservator", Brochure, G77E-771-W8 (79A98).
Whirlpool Gas Furnace Brochure, Form, #21023 (3-79).
Williamson, "'Five in One' Total Comfort System", Brochure, ADG 75-20M-NL-BBHH.

Primary Examiner—Noah Kamen
Attorney, Agent, or Firm—Tarolli, Sundheim & Covell

[57] ABSTRACT

A fuel burning furnace includes a number of energy efficient features. The furnace includes a heat exchanger in which combustion air is preheated by hot discharge gases. Diverters are provided in the heat exchanger to continually urge hot combustion gases toward the interior portions of the heat exchanger to improve its heat transfer characteristics. The furnace incorporates a number of features to determine malfunction and indicate inefficient operation. A humidification control system for the humidification or dehumidification of circulated air also is provided. The furnace also includes a blower motor system which compensates for loss of tension in driving belts and makes correction for blower speed in response to temperature variations.

39 Claims, 5 Drawing Sheets

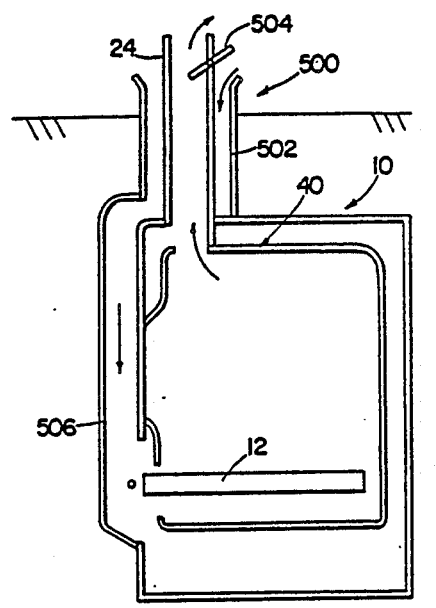
Fig. IB
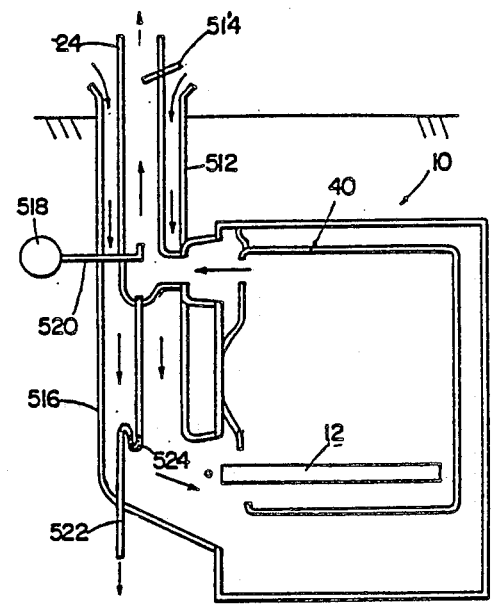
Fig. IC
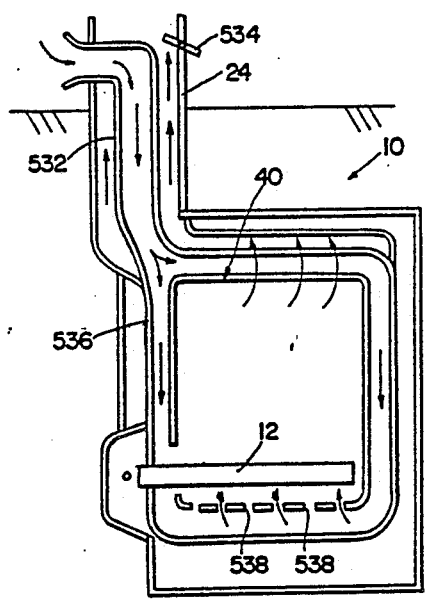
Fig. ID
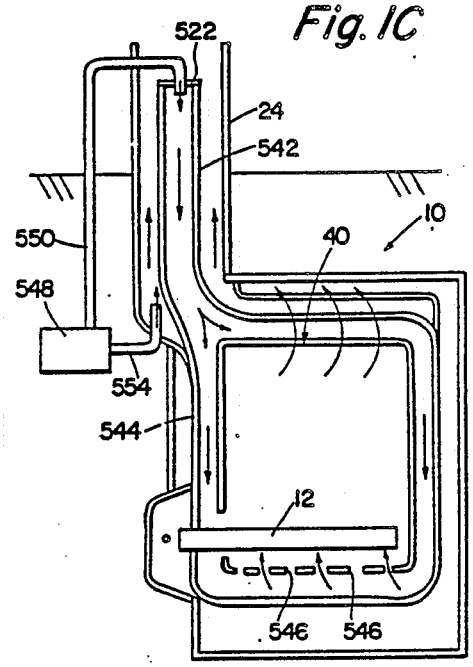
Fig. IE

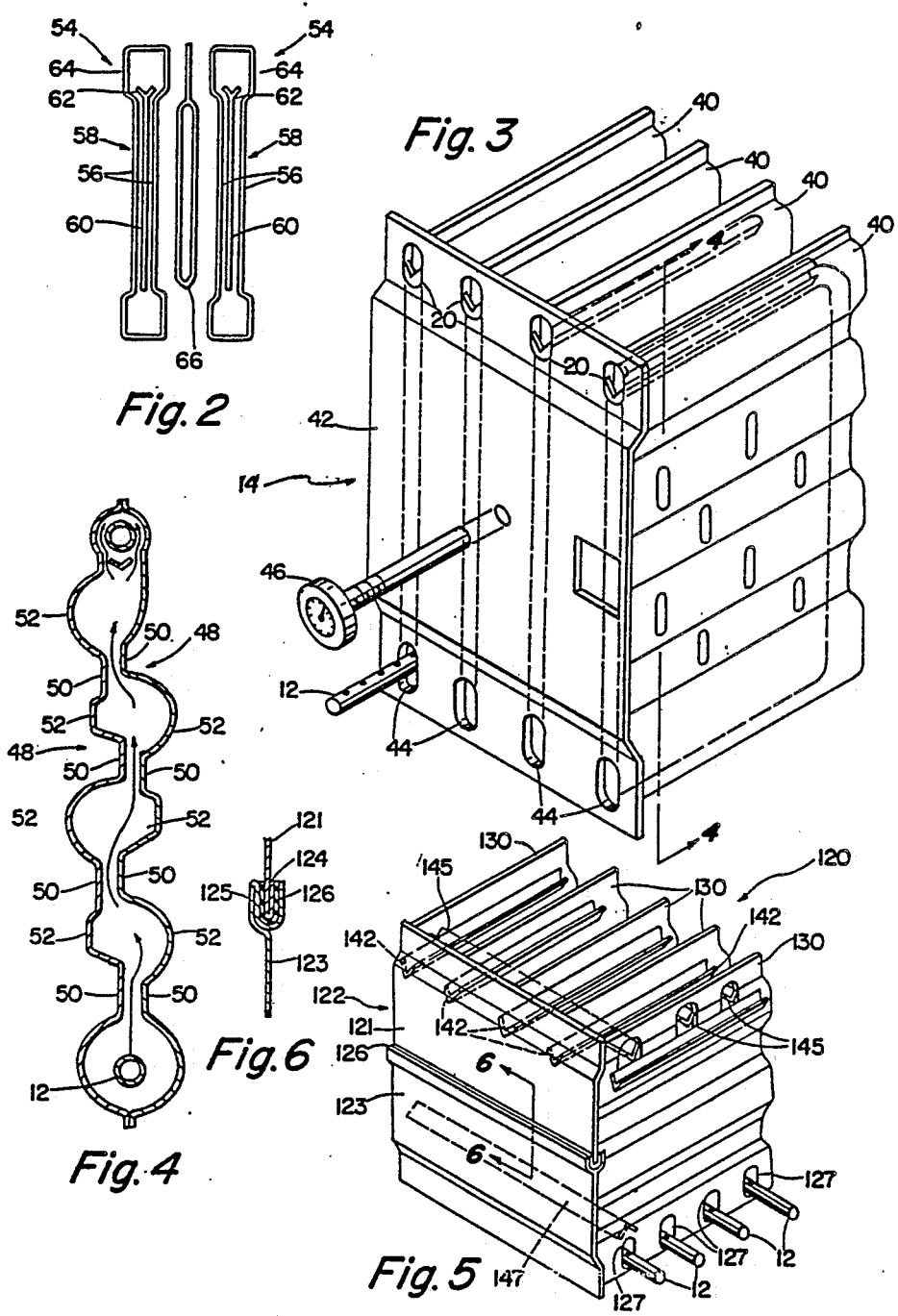

FUEL BURNING FURNACE

This is a divisional of copending application(s) Ser. No. 366,262 filed on June 12, 1989, now U.S. Pat. No. 4,922,890, which is a continuation of application Ser. No. 428,542, filed Sept. 30, 1982, now abandoned.

BACKGROUND OF THE INVENTION

1. Field of the Invention

The invention relates to fuel burning furnaces and, more particularly, to a fuel burning furnace having improved characteristics of heat circulation, heat transfer, and, in general, energy efficiency.

2. Description of the Prior Art

Rising fuel costs and depleted fuel supplies have been a serious problem of recent times. These problems have have initiated a nationwide concern for the energy efficiency of our fuel burning products. Among the products which use considerable amounts of fuel to operate are the furnaces which heat our homes and offices. While prior art furnaces do serve to provide heat to our living quarters they have done so in a relatively inefficient and wasteful manner.

Most prior fuel burning furnaces constitute box-type structures with several major openings including an inlet for air to be heated, an outlet for heated air, and an outlet for combustion gases. The furnaces additionally contain a heat exchanger for extracting heat from hot combustion gases and for containing spent fuel fumes, burners and a pilot to ignite and convert the fuel to energy, and a blower to force air to be heated through the heat exchanger and outwardly to areas to be heated.

Prior gas furnaces, although effective to produce heat, are not entirely satisfactory from an energy efficiency viewpoint. Much of the inefficiency inherent in furnaces of present design stems from the poor heat transfer characteristics of the heat exchangers. These heat exchangers generally provide a series of heat exchange enclosures, each one housing a burner, arranged in side-by-side relation. The burners are located near the bottom of the heat exchange enclosure and hot combustion gases are allowed to rise through the enclosure, thus heating the interior walls so that heat may be transferred to the exterior surfaces which air to be heated is passed. A problem with these heat exchangers is that hot combustion gases pass essentially unrestricted up through the enclosure and out the flue vent, thus wasting large quantities of heat which could otherwise be extracted from the flue gases. Since much of the heat which could be utilized is lost through the flue vent and chimney, more fuel must be burned to provide the requisite heating air.

Another problem not adequately addressed by prior furnaces relates to providing the burners with sufficient fresh air to complete combustion of the fuel being burnt. During the winter months, when the furnaces are used the most, it is a standard practice to keep the house as airtight as possible to prevent warm air from escaping and to provide a good insulating effect. This creates a problem, however, in that an adequate supply of fresh air is not allowed to enter the house. Fresh air is necessary to complete the combustion process and to extract all the potential energy provided by the combustible fuel. If complete combustion does not occur, a significant amount of the combustion fuel will be vented along with the hot combustion gases. As a result of this incomplete burning of fuel, additional fuel must be burned to compensate for the inefficiency of the furnace and provide the requisite heat necessary to maintain proper temperature levels.

Recent proposals have provided electric ignition systems to ignite the fuel at the burners when the temperature drops below a predetermined level. It has been suggested that electric ignition systems are more energy efficient than the gas pilot systems presently utilized, as they are not continually burning and are only activated on command from a remote temperature sensor. These electrical ignition systems have suffered from several drawbacks. In spite of the fact that they are not continually operating, as is the case with the standard gas pilots, their overall efficiency is very poor, on the order of about 30%. Another problem which occurs from the use of electric ignition is that each time at the beginning of combustion cycle when the furnace burners have come on, water vapor is permitted to condense on surfaces of the heat exchanger because the electric ignition does not dry it off. This water tends to corrode the heat exchangers and shorten their life. Even more importantly, corrosion reduces the heat transfer characteristics of the heat exchanger, since a layer of rust develops on the outer surfaces on the heat exchange enclosures.

Yet another problem which has not been adequately addressed relates to the detection of problems of heat flow and air circulation in the furnace. Prior furnaces provide no means of checking the efficiency or operation of the furnace, thus making it very difficult to detect and correct problems at an early stage. As problems with air circulation and heat transfer develop, the furnace must burn more fuel in order to maintain adequate room temperatures. For instance, if the heat transfer characteristics of the heat exchanger were to fall to 50% of their normal operating values, the furnace would burn twice as much fuel to compensate for this problem with no indication that a problem even existed, and what is worse, no way to even check. Thus, problems may go undetected for long periods of time with nothing being done to correct them.

SUMMARY OF THE INVENTION

In accordance with the foregoing considerations, the present invention provides a new and improved fuel burning furnace having a number of energy efficient features. A significant feature of the invention relates to the heat exchanger and how heat is transferred, circulated and discharged. In order to improve the heat transfer characteristics of the heat exchanger various provisions are made for urging the hot combustion gases toward the interior surfaces of the heat exchanger. Other provisions are made to contain the hot combustion gases for longer periods of time in order to extract as much of the available heat as possible In one embodiment, a longitudinally-extending baffle plate extends through the center of the heat exchanger at a location above the burner. Where this feature is utilized, hot combustion gases are diverted to either side of the baffle plate and toward the interior surfaces of the heat exchanger, thus bringing the hot combustion gases in closer contact with the interior surfaces and improving the heat transfer characteristics of the heat exchanger. Additionally, a V-shaped baffle is provided near the top of the enclosure substantially parallel to the burners so that as the hot combustion gases rise toward the flue vent port, the hot combustion gases again are diverted toward the interior portions of the enclosure before exiting the heat exchanger. The baffles also extract heat from the hot combustion gases, thus improving the heat transfer characteristics of the furnace.

In order to more effectively utilize the combustion gases at their hottest temperature, diverters are provided directly above the burners to direct the hot combustion gases toward the interior surfaces of the enclosure shortly after ignition. Each diverter is generally A-shaped, as viewed from the end, and is located directly above one of the burners and extends along its length. The sloping side of the baffle have a plurality of apertures of various sizes and shapes through which the hot combustion gases are forced, thus directing the hot combustion gases toward nearly the entire interior surfaces of the heat exchange enclosure. This is a significant improvement over prior heat exchangers which allow the hot combustion gases to pass from the burners to the flue vent essentially unrestricted. By utilizing the just-ignited gases more effectively, the heat transfer characteristics of the heat exchanger can be greatly improved.

In another embodiment of the present invention, the heat transfer characteristics of the heat exchanger are improved by providing adjacent sidewalls of the enclosure with inwardly extending notches which form restrictions in the passageway of the hot combustion gases. In preferred practice, the inwardly extending notches are alternated with outwardly extending portions of the side walls, thus providing a heat exchanger with very irregular surfaces. By providing restrictions to the passage of the hot combustion gases, the hot combustion gases are forced into direct contact with the side walls at the points of restriction, thus improving the heat transfer characteristics of the enclosure. In addition, the outwardly-extending irregular surfaces of the heat exchange enclosure create a turbulent action of the hot combustion gases as they pass from the burners toward the flue vent port. The turbulent action of the hot combustion gases as they pass through the heat exchanger is important as it increases the circulating effect of the hot combustion gases which, in turn, increases convective heat transfer.

In still another embodiment of the present invention, the heat exchangers are provided with interior baffle plates which form weaving passageways from the burner toward the flue vent. Where this embodiment is utilized, the hot combustion gases are forced to remain in the heat exchanger for longer periods of time, thus allowing them to dissipate their heat to the interior surfaces of the heat exchange enclosure.

In another embodiment of the heat exchanger pairs of heat exchange enclosures are provided and are joined at their centers so that hot combustion gases may pass between them. Each of the enclosures houses a separate burner. When it is necessary for the furnace to produce heat, one of the burners initially is ignited and the hot combustion gases from this burner are shared between both enclosures with the second burner remaining unignited. This feature enables much more heat to be extracted from the hot combustion gases from the fuel burner than otherwise would be possible A time delay is provided for the second burner such that it will be ignited a fixed time after the first burner is ignited. If adequate heating is not performed during the time delay, the second burner will be ignited In preferred practice, a plurality of heat exchanger pairs are provided, with one burner being ignited directly on command and the second burner being delayed for a fixed period of time.

Another alternative embodiment of a heat exchanger includes a plurality of heat exchange enclosures contained in an external housing. Hot flue gases, are circulated over the outer surfaces of the sidewalls of the enclosures and are confined by the housing. Air to be warmed is circulated within the enclosures and is confined by the sidewalls. An advantage of this embodiment is that the number of heat exchange enclosures can be greater than the number of burners, therefore, the effective surface area which is in heat exchange relation with the hot flue gases is increased without increasing the number of burners necessary to operate the system.

Another feature of the present invention lies in the provision of a heat exchanger which is provided with a return air diverter positioned between adjacent heat exchange enclosures. This feature allows the air to be heated to be urged toward the exterior surfaces of the adjacent heat exchange enclosures, thereby placing the air to be warmed in closer heat exchange relation with the exterior surfaces of the enclosures. The diverter is made of steel, the same as that of the heat exchangers, and is mounted on the same fabricated weldment structure. The diverter also serves as an extrusion of the heat exchangers and helps to extract more heat from the hot combustion gases.

In another embodiment of the heat exchanger, heat exchange enclosures are joined near their lower sections so that the burners may be inserted transversely. Accordingly, a single burner may pass through several heat exchange enclosures. In this embodiment, the number of heat exchange enclosures may be greater than the number of burners, thus effectively enlarging the surface area in which heat transfer may be carried out. For instance, four burners may be placed in heat exchange relation with six different heat exchange enclosures, each burner serving to introduce heat to different portions of each enclosure.

In order to minimize heat loss through the flue vent and improve combustion efficiency of the burners, a combustion air preheating system is provided. The air preheating system includes a passageway which extends through the interior of the heat exchange enclosure, the passageway being in heat exchange relation with the hot discharged combustion gases. The passageway is communicated with a source of fresh air, preferably from the exterior of the house. The fresh air is brought in through the flue vent into the heat exchange enclosure, thereby preheating the air. The preheated air then is introduced near the burner to assist in the combustion process. This is an important feature in that it provides sufficient fresh air to complete the combustion process so that unnecessary fuel is not burned, and further reduces the burden of heating the air by taking advantage of the hot flue gases as they are vented.

Still another feature of the present invention lies in the provision of a fuel burning furnace which indicates decreasing efficiency at an early stage. A temperature sensor is provided within the heat exchanger assembly to measure temperature of the circulating air before it exits the heat exchanger assembly. Problems in heat transfer can be determined by periodically noting the temperature of the circulating air. Additionally, a manometer is provided which extends into the furnace enclosure to indicate differential pressure between the inside and outside furnace enclosure thereby indicating problems in circulation. A by-pass line is additionally provided on the fuel line so that in case of power failure, fuel still may be provided to the burners.

To compensate for loss of tension in the drive belt of a blower motor, a spring-loaded idler pulley is provided. The pulley is continually urged against the belt to keep tension on it. As the belt wears, and normally would begin to slip, the spring-loaded idler pulley keeps tension on the belt and prevents slippage.

In addition, the drive pulley includes two halves which are connected by biasing springs. The halves form a V-shaped groove in which the drive belt rides. As the ambient temperature increasess the springs expand and urge the pulley halves closer together. This causes the drive belt to ride higher in the groove, thus effectively increasing the diameter of the pulley and causing the fan to turn faster. Thus, blower motor speed is controlled in response to temperature.

Another significant feature of the invention is the addition of a humidity control device which works to keep a proper amount of moisture in the air at all times. In winter when the air is very dry, the system works to add water vapors to the air as it is passed through the furnace This is accomplished by installing an evaporater in the furnace plenum to which water is supplied. Porous, mineral wool plates are installed on the sides of the evaporater, both of these plates resting in a trough which is filled with the water at a certain height. The plates will absorb water by wick action and increase the relative humidity of the circulating air and at the same time, heat will be extracted from the flue gases as they are passing out of the furnace.

In summertime when the air is very moist, the system removes water vapors from the air. This is done by passing city water supply or well or river water through coils over which warm water-laden air is passed, causing condensation on the coils and thus extracting unwanted water from the atmosphere. These and other features and a fuller understanding of the invention may be had by referring to the following description and claims, taken in conjunction with the accompanying drawings.

BRIEF DESCRIPTION OF THE DRAWINGS

FIGS. 1B, 1C, 1D, and 1E are schmematic, cross-sectional views of air preheating systems included as part of the invention;

FIG. 2 is a cross-sectional view of two of the enclosures of a heat exchanger, and inside and outside diverting baffles;

FIG. 3 is a perspective view of the heat exchanger showing a preheating system;

FIG. 4 is a sectional view of one embodiment of a heat exchange enclosure;

FIG. 5 is a perspective view of another embodiment of a heat exchanger showing burners extending transversely through each heat exchange enclosure;

FIG. 6 is a sectional view of a portion of FIG. 5 as seen from a plane indicated by line 6—6;

DESCRIPTION OF THE PREFERRED EMBODIMENT

Figure 1:
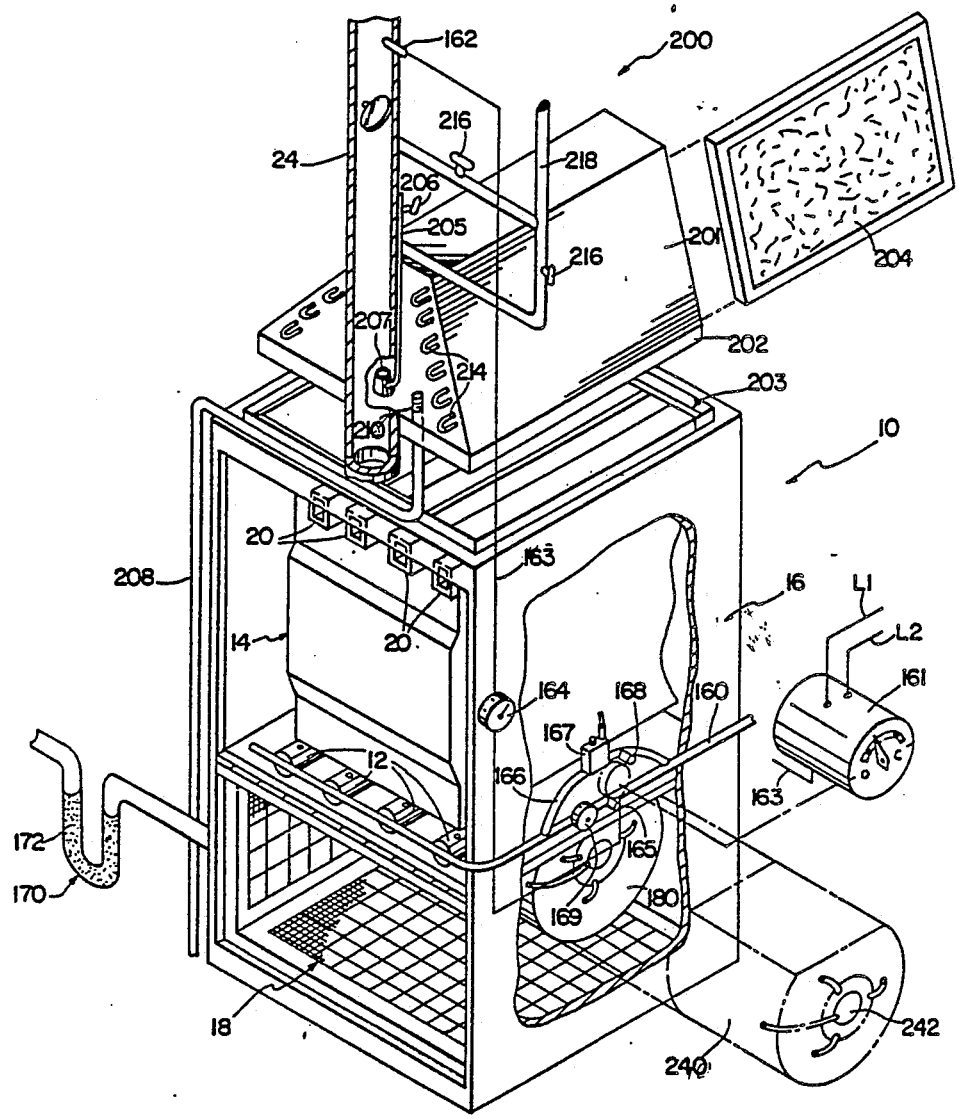
FIG. 1 is a schematic, perspective view of a fuel burning furnace embodying a preferred practice of the present invention.

Referring to FIG. 1, a fuel burning furnace embodying the preferred practice of the present invention is indicated generally by the numeral 10. The fuel burning furnace 10 is shown as having burners 12 and a heat exchanger indicated generally by the numeral 14. The burners 12 are substantially enclosed by the heat exchanger 14 and serve to produce hot combustion gases. In preferred practice the burners are ignited by a standby continuous pilot light (not shown) as is well known.

In normal operation, the hot combustion gases are contained by an interior portion of the heat exchanger 14, as will be described Other exterior portions of the heat exchanger 14 are located in heat exchange relationship with return air to be heated and communicated to the areas to be heated. The furnace 10 is enclosed by a metal housing indicated generally by the numeral 16. In preferred operation, return air is drawn through a filter compartment 18 of the housing 16 and circulated past the outer portions of the heat exchanger 14.

Hot flue gases produced by the burners 12 are vented through exhaust ducts 20 formed in upper portions of the heat exchanger 14. The ducts 20 discharge into a manifold (not shown). The manifold is connected to a flue vent pipe 24 which directs the flow of flue gas to the outside atmosphere.

Referring to FIG. 3, the heat exchanger 14 includes a plurality of heat exchange enclosures 40. The heat exchange enclosures 40 are of generally rectangular shape, as viewed from the side, and have a substantially elliptical cross section, as viewed from the front, with the major axis of the ellipse oriented vertically. The front surfaces of the enclosures 40 are formed by a common face plate 42. A lower portion of the face plate 42 is provided with opening 44 for accommodating burners 12 which extend therethrough into the enclosures 40. Upper portions of the face plate 42 additionally include the exhaust ducts 20 for venting combustion gases from the enclosures 40. A temperature gauge 46 is provided to sense the temperature of the air being heated within the heat exchanger 14. The temperature gauge 46 enables decreases in the temperature of the air being passed through the exchanger 14 to be noted. Temperature decreases will indicate heat transfer problems occurring within the heat exchanger 14.

Referring to FIG. 4, each heat exchange enclosure 40 includes a pair of adjacent sidewalls indicated generally by the numerals 48 Interior portions of the walls 48 are in heat exchange relation with the hot flue gases as the gases rise from the burner 12. Exterior portions of the walls 48 are in heat exchange relation with air to be heated The sidewalls 48 include inwardly extending notches 50. The inwardly extending notches 50 on adjacent sidewalls 48 form restrictions at selective locations along the length of the heat exchange enclosure 40 in order to restrict the flow of hot flue gases and bring them into close contact with the inner portions of the walls 48, thus effecting improved heat transfer The walls 48 additionally are provided with outwardly extending notches 52 which alternate with the inwardly extending notches 50. The inwardly and outwardly extending notches 50, 52 cause the rising hot flue gases to pass through the heat exchange enclosure 40 in a turbulent manner, thereby increasing conductive and convective heat transfer The height of the heat exchange enclosure 40 is nearly the same as the height of a conventional heat exchanger, but the heat exchange enclosure 40 has more surface area. Thus having a large surface area, the heat exchange enclosure 40 will extract much more heat from the hot combustion gases. Also, because there is no straight path for combustion gases to vent from the system, it will take much longer for exhaust gases to be exhausted, which also is an advantage.

Although the sidewalls 48 are shown in FIG. 4 as being irregular, this is not absolutely necessary. Referring to FIG. 2, heat exchange enclosures 54 are shown as having a single inwardly extending portion 56 intermediate the top and the bottom portion of each sidewall 58 Where this configuration is utilized, a baffle plate 60 extends longitudinally through the center of the enclosure 54. The baffle 60 is located intermediate the sidewalls 58 and serves to divert hot flue gases from the burners 12 toward the inner portions of the sidewalls 56 to improve the heat transfer characteristics of the heat exchange enclosure 54. Near the top of the baffle 60, a V-shaped baffle 62 is provided to urge hot combustion gases toward outwardly extending portions 64 near the top of the sidewalls 58. The baffle 62 restricts the free flow of hot flue gases due to reduction of the cross-sectional opening.

A generally elliptical baffle 66 (in cross-section) additionally is provided between adjacent heat exchange enclosures 54 as shown in FIG. 2. As return air to be warmed circulates through the heat exchange enclosures 54, it is urged toward the outer surfaces of adjacent sidewalls 58. The use of baffles 60, 62, and 66 serves to keep the hot flue gases and return air to be heated in closer heat exchange relation and thus more effectively heat the surrounding air.

Figures 9, 10:
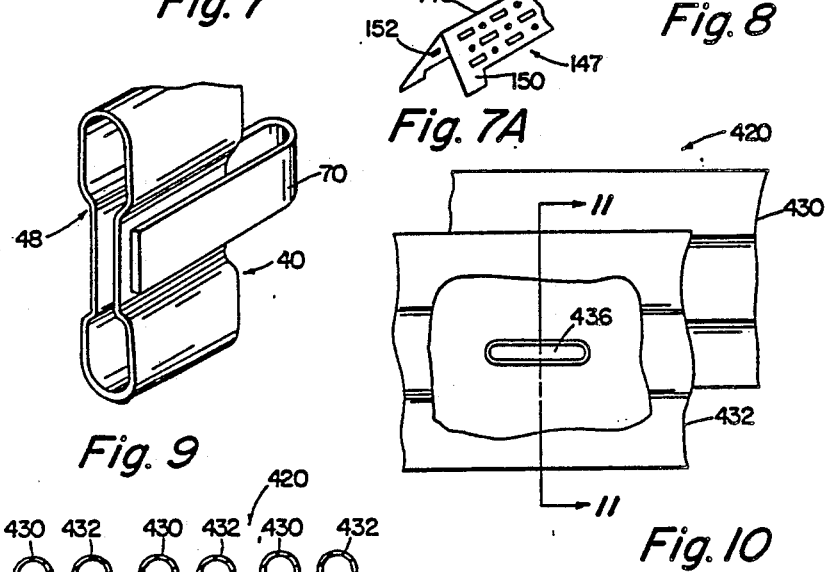
FIG. 9 is a perspective view of a clip attached to adjacent sides of a heat exchange enclosure.
FIG. 10 is a side elevational view of one embodiment of a heat exchanger according to the invention.

Referring to FIG. 9, a resilient clip 70 is provided to engage adjacent sidewalls 48 of the heat exchange enclosures 40. The clip 70 serves to keep the sidewalls 48 from expanding and contracting relative to a fixed support structure and thereby creating a popping sound. By reducing the movement of the sidewalls 48 caused by the expansion and contraction under heated and subsequent cooling conditions, the life of the heat exchange enclosures 40 can be significantly prolonged In addition, the clip 70 gives more mass to the heat exchanger 14, thus enabling it to extract more heat from the hot combustion gases and at the same time enabling it to stay hot for a longer period of time.

Figures 12, 13, 14:
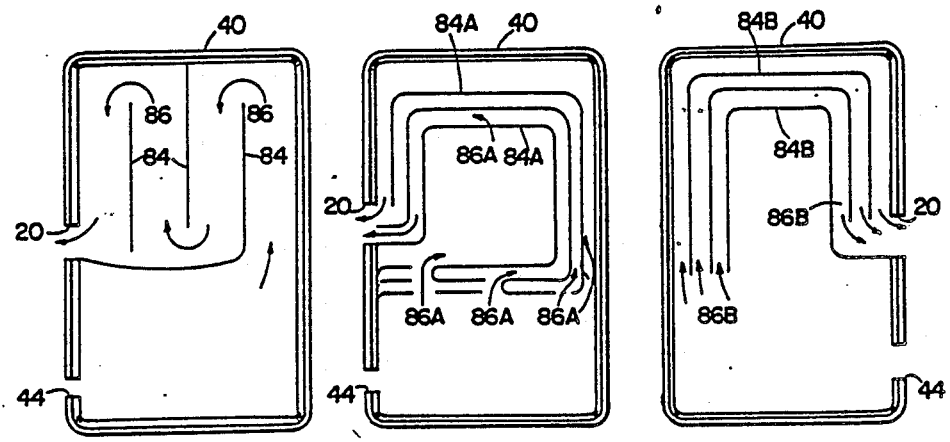
FIGS. 12, 13 and 14 are cross-sectional views of interior baffle plates for containing hot flue gases in a heat exchange enclosure prior to venting.

Referring to FIG. 12, a method for retaining hot flue gases in the enclosure 40 and extracting more heat is illustrated In this embodiment of the heat exchange enclosure 40, a plurality of vertically oriented interior walls 84 are provided to form various passageways 86 through the heat exchange enclosure 40. The walls 84 serve to retain the hot flue gases for an extended period of time and allow more of the useful heat to be transferred to the interior surfaces of the sidewalls 48. The interior walls 84 can be arranged to define a variety of passageways 86. Interior walls 84A and 84B define alternate passageways 86A and 86B as illustrated in FIGS. 13 and 14, respectively Referring to FIG. 5, another embodiment of the heat exchanger is shown and is indicated generally by the numeral 120. In this embodiment, a plurality of heat exchange enclosures 130 are provided with openings 127 in their lower side portions for accommodating the burners 12 which are placed therethrough. In this embodiment, lower portions of the heat exchange enclosures 130 are connected at the openings 127 so as to enclose substantially all of the burners 12. Each burner 12 extends through each of the heat exchange enclosures 130 so that each heat exchange enclosure 130 contains a portion of the burner 12. In this embodiment, the burners 12 extend through the sides of each of the heat exchange enclosures 130, rather than through the front as previously described for the heat exchanger 14. By arranging the burners 12 as described above, the number of heat exchange enclosures 130 can be greater than the number of burners 12, thus increasing the heat exchange surface without increasing the number of burners 12.

Referring to FIGS. 5 and 6, each heat exchange enclosure 130 is connected by a common face plate 122. The face plate 122 is shown as having an upper section 121 and a lower section 123. The upper section 121 has a reversely bent portion 124 near its lower edge. The lower section 123 has a reversely bent portion 125 near its upper edge. The portions 124, 125 are placed together with an intermediate seal 126 of silicone rubber or like material to form the face plate 122 The portions 124, 125 are relatively movable so as to prevent premature heat exchanger failure due to repeated expansion and contraction, but they nevertheless provide a good thermal seal.

Where the heat exchanger 120 is used, each heat exchange enclosure 130 is provided near its upper end with V-shaped baffles 142 extending from front to back. A plurality of V-shaped baffles 145 are oriented parallel with the burners 12 at the upper end of the heat exchange enclosures 130. Each burner 12 is provided with a diverter 147 which extends parallel to the burner through the heat exchange enclosures 130. Details of the diverter 147 are described subsequently with respect to another heat exchanger embodiment.

Figures 7, 7A, 8:
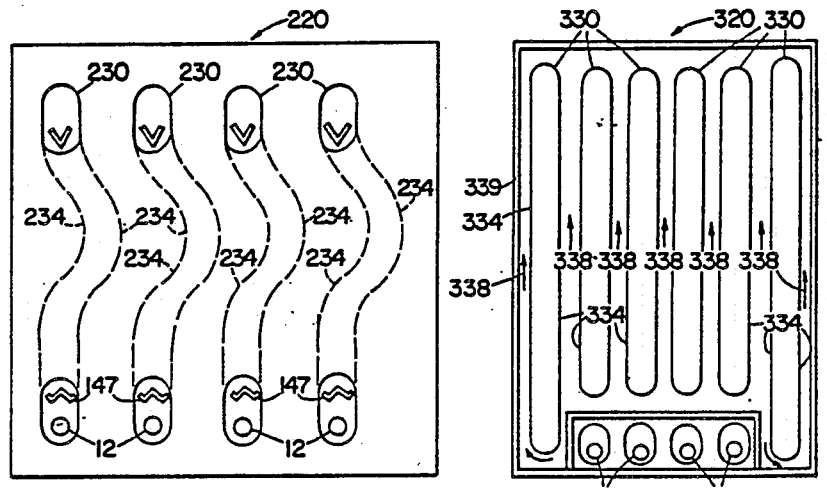
FIGS. 7 and 8 are cross-sectional views of other embodiments of a heat exchanger.
FIG. 7A is a perspective view of a portion of a gas diverter usable with a heat exchanger according to the invention.

Referring to FIG. 7, another embodiment of the heat exchanger 14 is indicated generally by the numeral 220. In this embodiment, heat exchange enclosures 230 include walls 234 which curve outwardly and upwardly in order to increase the surface area of the heat exchange enclosures 230 without increasing the overall height of the heat exchanger 220. This arrangement also provides a restriction to the path of the hot combustion gases which are ready to be vented. By increasing the length of the path which the hot combustion gases will take, the hot combustion gases tend to sweep along the inside walls of the heat exchanger 220 and thereby increase the heat transfer.

A gas diverter 147 in the form of an inverted V is provided and extends through the heat exchange enclosure 230 above the burner 12. Referring to FIG. 7A, the diverter 147 is shown as having a solid top portion 148 and sidewalls 150 with a plurality variety of apertures 152. The apertures 152 are arranged so as to direct the flow of the hot flue gases toward the inner surfaces of the walls 234 of the heat exchange enclosure 230. By directing the hot flue gases toward a location near the walls 234, the hot combustion gases are brought into heat exchange relation with the interior portion of the walls 234 intermediately after combustion. Although the diverter 147 is shown as being used with the heat exchange enclosure 230, it will be appreciated that the diverter 147 also can be used with any of the embodiments of the heat exchange enclosure.

Referring to FIG. 8, an alternative embodiment of a heat exchanger is indicated generally by the numeral 320. In this embodiment, heat exchange enclosures 330 are contained in an external housing 339. Hot flue gases, indicated by the arrows 338, are circulated over the outer surfaces of the sidewalls 334 of the enclosures 330 and are confined by the housing 339. Air to be warmed is circulated within the enclosures 330 and is confined by the sidewalls 334. Where this embodiment is utilized, the housing 339 contains the hot flue gases released by the burners 12 and allows them to be vented. A significant advantage of the heat exchanger 320 is that the number of heat exchange enclosures 330 is greater than the number of burners 12, therefore, the effective surface area which is in heat exchange relation with the hot flue gases is increased without increasing the number of burners necessary to operate the system.

Figure 11:
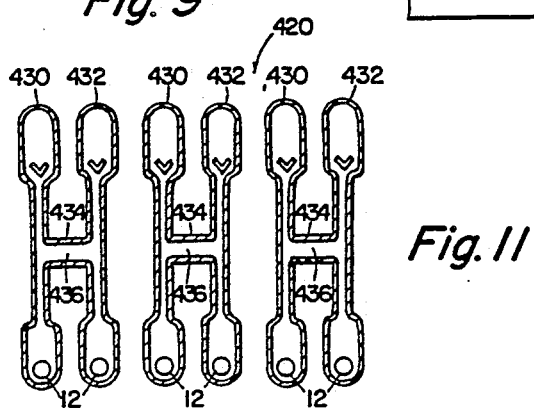
FIG. 11 is a cross-sectional view as seen along a plane indicated by line 11—11 in FIG. 10 of another embodiment of the heat exchanger.

Referring to FIGS. 10 and 11, another embodiment of the heat exchanger is indicated by the numeral 420. In this embodiment, a pair of heat exchange enclosures 430, 432 are placed in side-by-side relation. Adjacent sides of the enclosure pairs 430, 432 are joined by laterally extending portions 434 such that a passageway 436 is formed between the enclosures 430 and 432. Each of the enclosures 430, 432 houses a burner 12. The burners 12 extend through the lower portions of the enclosures 430, 432. Where this configuration is utilized, hot flue gases are free to pass between the enclosures 430, 432 through the passageway 436. In preferred operation of this embodiment of the present invention, the burners 12 in the enclosures 430 are ignited when the temperature of the air to be warmed falls below a preset level. The burners 12 in the enclosures 432, however, is not ignited until after a fixed period of time has elapsed after the burners 12 in the enclosures 430 has been ignited. After the first-ignited burners 12 are initially ignited, the hot flue gases produced therefrom are shared by the enclosures 430, 432, thus increasing the surface area available to the air to be warmed as it passes over the exterior portions of the heat exchange enclosures 430, 432. If the heat produced by the first-ignited burners 12 is not sufficient to bring the areas to be heated up to the preset temperature, the second-ignited burners 12 are ignited to provide additional heat. This delayed heating is a significant advantage over presently existing heat exchange units since all burners do not have to be ignited to make small corrections in room temperature fluctuations. In addition, prior to the time the second-ignited burners 12 are ignited, the hot combustion gases produced by first-ignited burners 12 have more surface area available in which to dissipate their heat.

Referring to FIG. 1, the burners 12 are supplied with combustible fuel by a supply line 160. The supply line 160 is provided with a motorized valve 161 which regulates the flow of fuel through the burners 12 in response to temperature changes. The valve 161 is energized by a pair of lead lines L1, L2 which are connected to a 110 volt source of electricity. A thermocouple 162 is disposed within the vent pipe 24 and is connected to the valve 161 by a lead line 163. Although the thermocouple 162 can be located in a number of different positions, it is expected that the thermocouple 162 will be placed at the location where flue gases are vented out into the chimney. The thermocouple 162 provides a control signal to the valve 161 so as to control the flow of gas to the burners 12 in a manner directly proportional to the temperature of the flue gases. A temperature indicator 164 is disposed in the line 163 so as to provide a visual indication of the temperature of the flue gases being discharged from the furnace 10.

The fuel line 160 is also provided with a manually operated valve 165 and a bypass line 166. The bypass line 166 permits the passage of fuel through the burners 12 in the event that a power failure occurs, in which case the flow of fuel normally is shut off. A normally closed solonoid-operated valve 167 is provided for the bypass line 166. In case of a power failure, the valve 167 is opened and fuel will be permitted to flow through the bypass line 166, if desired. A hand-operated valve 168 is provided in the bypass line 166 so that fuel will flow through the bypass line 166 only when desired. In preferred operation, the valve 165 in the main supply line 160 is closed at the same time that the valve 168 is opened.

The furnace 10 is provided with a number of features for monitoring its performance and thus detecting problems at an early stage. To keep track of the amount of fuel being used, a flow meter 169 is provided in the line 160 If desired, the thermometer 46 or the thermometer 164, or both, can be connected to an alarm bell (not shown) so as to provide an aural indication if the temperatures within the furnace 10 exceed predetermined limits. The furnace 10 additionally is provided with a clear glass or plastic manometer 170 for detecting pressure differentials between the exterior and the interior of the filter compartment 18. The manometer 170 essentially is U-shaped and is filled with a heavy fluid 172, such as red draft gauge oil. Under normal operating conditions, the level of the fluid 172 on the atmosphere side of the U-shaped fixture would be higher than on the other side because the filter compartment 18 is under pressure. As pressure inside the filter compartment 18 decreases due to insufficient airflow, the fluid level on either side of the U-shaped manometer 170 would tend to be the same, thus indicating insufficient airflow.

Figure 15:
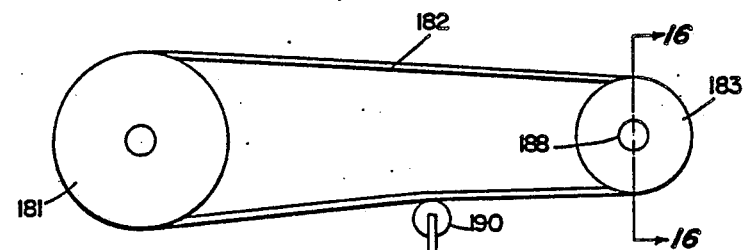
FIG. 15 is a side elevational view of a blower motor system showing a V-belt tensioner; and, FIG. 16 is a cross-sectional view of a spring-biased pulley for adjusting motor speed in response to temperature.
Figure 16:
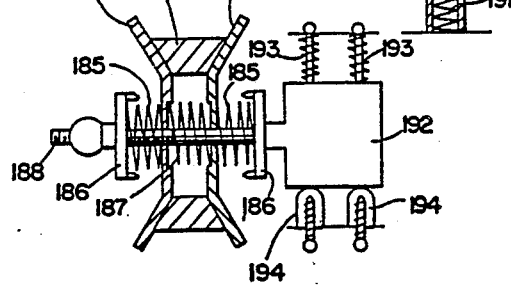

Air is drawn into the compartment 18 and is forced through the heat exchanger 14 by means of a belt-driven, squirrel-cage type fan 180 as shown in FIG. 1. The squirrel-cage fan 180 is connected to a pulley 181 shown in FIG. 15. The pulley 181 is rotated by a V-shaped drive belt 182 connected to a motor-operated pulley 183. Referring to FIG. 16, the pulley 183 is mounted to an axle 188 extending outwardly of a motor 192. The pulley 183 includes two identical halves 184 which fit together on the axle 188 and form a grove into which the V-belt 182 rides Springs 185 are provided between the pulley halves 184 and collars 186. Another spring 187 is located between the two halves 184 encircling the axle 188. The spring 187 has a lower coefficient of expansion than each of the springs 185 so that, as the temperature inside the housing 16 increases, the springs 185 expand and urge the pulley halves 184 closer together. In turn, the V-belt 182 is caused to ride up higher on the pulley 183 and effectively increase the diameter of the pulley 183. By increasing the diameter of the pulley 183, the V-belt 182 rotates faster and increases the speed of the squirrel-cage fan 180. Thus, the speed of the fan 180 increases at a rate directly proportional to the temperature inside the housing 16.

The motor 192 is mounted on spring-loaded brackets 193 and mounts 194, and can be adjusted to compensate for any misalignment of the pulleys 181, 183. As the V-belt 182 becomes less tense due to stretching it will begin to slip on the pulleys 181, 183. To compensate for this lack of tension and possible slippage of the belt 182, an idler pulley 190 continually is urged against the belt 182 by a spring 191. As the belt 182 begins to lose tension, the spring 191 continually urges the idler pulley 190 against the belt, thus keeping the belt 182 under proper tension Referring to FIG. 1, the furnace 10 is provided with a humidity control device indicated generally by the numeral 200. The humidity control device 200 serves to increase the water vapor content of ambient air when the air is dry, and serves to decrease the water vapor content of the air when the air is moist. The humidity control device 200 includes a generally A-shaped frame 201, a trough 202, removable side panels 204, a water inlet 205 and a float valve 207. The device 200 also includes a drain pipe 208 for conveying water from the trough 202 to the floor or other suitable location A small detachable extension pipe 210 is provided for the pipe 208 where it opens into the trough 202. The extension pipe 210 enables water to be maintained in the trough 202 at a predetermined level. When it is desired to prevent a build up of water in the trough 202, the extension pipe 210 can be removed.

The humidity control device 200 sets atop the furnace 10 on an L-shaped channel 203 located above the furnace plenum. The A-shaped frame 201 is located above the trough 202 and supports the removable side panels 204. When it is desired to humidify the air (as in the wintertime), water is supplied to the trough 202 via the inlet 205. Water is permitted to flow upon operation of a shutoff valve 206 in the inlet line 205. The water is kept at a predetermined level by the float valve 207 and the pipe 210. The side panels 204 generally are of a water-absorbing, porous material and are placed in contact with the water in the trough 202 so that the side panels 204 remain saturated. As air passes through the side panels 204, the water contained therein will evaporate, thus causing an increase in the water vapor content of the ambient air.

The humidity control device 200 also can be used as a dehumidifier when the the side panels 204 are removed and condensing coils 214 are exposed. When used as a dehumidifier, the device 200 should be used with the extension pipe 210 removed. The condensing coils 214 are placed in series with the household plumbing 218 (connections not shown), and supplied with bypass valves 216 so that when the humidity control device 200 is used as a humidifier, the condensing coils 214 can be bypassed. If desired, a flow switch (not shown) can be installed in the pipes 205, 218. The flow switch can be connected to the blower motor 192 such that the blower motor 192 automatically will be activated whenever the humidity control device 200 is being used either for humidification or dehumidification. As water-laden air passes over the condensing coils 214 (which are maintained at a lower temperature than the surrounding air due to cool water being passed through them via the household plumbing), water vapor will begin to condense on the coils 214 and will be deposited in the trough 202. The humidity control device 200 can be used in conjunction with the furnace 10 or it can be used independently to humidify and dehumidify circulated air.

Referring once again to FIG. 1, a lightweight blower fan 240 is illustrated schematically. The fan 240 is intended for use in case an electrical power failure occurs or in case the main power motor 180 experiences an unexpected failure. In these circumstances, the fan 180 can be removed from the furnace 10, and the alternate fan 240 installed in its place. The fan 240 is provided with a rechargable battery 242 of either 6 or 12 volts.

The invention also provides a system for preheating combustion air for the burners 12. Referring generally to FIGS. 1B, 1C, 1D, and 1E, the air preheating system provides that preheated air will be drawn into the furnace 10 only when burners 12 are in operation and calling for air in order to complete combustion. Preheated air for combustion can provide many beneficial effects which are missing from unpreheated combustion air. More specifically, preheated air can increase the flame intensity, improve thermal and combustion efficiency, decrease the consumption of fuel, require less time to obtain desired furnace temperature, cool the flue gas temperature, and minimize the possibility of combustion product leakage At the same time, preheating the combustion air can give more surface area to the heat exchangers so as to provide more heat transfer to circulating heated air.

Referring particularly to FIG. 1B, a preheating/gas discharge system 500 is included as part of the furnace 10. The system 500 includes a jacket 502 disposed about the vent pipe 24. The vent pipe 24 includes a so-called barometric damper 504. The barometric damper 504 applies atmospheric pressure to the flue gas vent system 500. The damper 504 automatically will control air pressure within the furnace 10 so as to prevent unnecessary pressure being applied to the gas burners 12 downwardly through the vent pipe 24 The jacket 502 is in communication with a manifold 506 which, in turn, is in communication with the burners 12. As will be apparent from an examination of FIG. 1B, combustion air for the furnace 10 will be directed downwardly intermediate the vent pipe 24 and the jacket 502. As a consequence, combustion air will be heated from flue gases passing outwardly through the pipe 24. Thereafter, the preheated combustion air can be directed through the manifold 506 to the burners 12.

An alternative embodiment of the air preheating/gas discharge system 500 is illustrated in FIG. 1C. A jacket 512 is disposed about the vent pipe 24. A barometric damper 514 is included as part of the vent pipe 24. A manifold 516 directs preheated combustion air from the jacket 512 to the burners 12. In this embodiment of the invention, a compressor 518 is provided to establish a source of compressed air. A pipe 520 extending outwardly of the compressor 518 is in communication with the vent pipe 24. A drain pipe 522 having a trap 524 is provided in a lower portion of the pipe 24 so that, at water vapor contained in the heated flue gases condenses and the pipe 24, either is allowed to drain to the floor or other appropriate location. The trap 524 is provided in order to prevent flue gases to be vented through the pipe 522.

In operation, the embodiment of FIG. 1C provides preheated combustion air for the burners 12 much as was done with the embodiment of FIG. 1B. In addition, use of the compressor 518 will assure that flue gases will be vented outwardly of the pipe 24. The compressor 518 will be used only when there is "negative pressure" tending to cause a flow of air backwardly through the vent pipe 24 into the furnace 10.

Yet another alternative embodiment of the invention is shown in FIG. 1D. In this embodiment of the invention, a somewhat more effective air preheating system is provided. The vent pipe 24 is relatively large. At a location outside the structure in which the furnace 10 is located, an air intake pipe 532 extends through an opening in the pipe 24. The intake pipe 532 is concentrically disposed within the vent pipe 24. A barometric damper 534 is included as part of the vent pipe 24. The intake pipe 532 is in communication with a jacket 536 which surrounds a major portion of the heat exchange enclosures 40. The heat exchange enclosures 40 are provided with a plurality of openings 538 in their bottom surfaces. By this construction, intake air is preheated very effectively not only during its passage through the intake pipe 532, but also during its passage around the heat exchange enclosures 40. The openings 538 enable preheated combustion air to be discharged uniformly at a location immediately adjacent to the burners 12.

The embodiment illustrated in FIG. 1E is a variation of the invention illustrated in FIG. 1D. In this embodiment of the invention, an air intake pipe 542 is disposed concentrically within the vent pipe 24. No barometric damper is provided in this embodiment of the invention. The intake pipe 542 is in communication with a jacket 544 which substantially surrounds the heat exchangers enclosures 40. A plurality of openings 546 in the lower surface of the heat exchange enclosures 40 permits combustion air to be directed into the heat exchange enclosures 40 at a location adjacent the burners 12.

In order to control the flow of air through the furnace 10, the compressor 548 is provided. A first line 550 is in communication with the intake pipe 542. The upper end of the intake pipe 542 is closed by a cover 552 through which the line 550 extends. This construction enables air under pressure to be forced into the intake pipe 542. A second line 554 extends outwardly of the compressor 548. The second line 554 is in communication with the vent pipe 24. The foregoing construction enables compressed, preheated combustion air to be supplied to the burners 12 while, at the same time, enabling heated combustion gases to be forced outwardly through the flue vent 24.

It will be appreciated from the foregoing description that the efficiency of the furnace 10 should be sufficiently great that the need for draft hoods and automatic flue dampers should be eliminated. Draft hoods, as are commonly in use with conventional furnaces, prevent a large quantity of room air to be mixed with hot combustion gases prior to discharge of the gases from the furnace. Although a draft hood is very inefficient for reducing the temperature of combustion gases, it is necessary with the design of conventional furnaces.

Automatic flue dampers, as is well-known, consist of a movable valve of some type placed in the flue vent of a conventional furnace. When combustion is occurring, the damper is moved to a position that will permit flue gases to be vented to the atmosphere. When combustion is not occurring, the damper will be closed in order to retain heated air within the structure. Unfortunately, not only are automatic dampers an additional expense item, they also have the inherent problem of potential failure. Obviously, if the damper fails to operate, either heated air will be permitted to escape from the structure, or combustion will occur with the flue vent blocked.

Because the furnace 10 according to the invention, in its preferred embodiment, draws combustion air entirely from outside the structure, there is no need for an automatic flue damper. That is, heated air within the structure cannot escape through the flue vent simply because there is no access to the flue vent other than through the furnace and, in turn, this air must come entirely from outside the structure. The need for a draft hood also is eliminated because the heat exchange enclosures are very efficient and because the intake air for combustion is preheated. Because the intake air is preheated by being in indirect contact with the flue gases, the temperature of flue gases is reduced to the point where it is not necessary to dilute the flue gases prior to their discharge. Accordingly, the need for a draft hood is totally eliminated.

Although the invention has been described in its preferred form with a certain degree of particularity, it will be understood that the present disclosure of the preferred form has been made only by way of example and numerous changes in the details of construction and combination and arrangement of parts may be resorted to without departing from the true spirit and scope of the invention as hereinafter claimed. It is intended that the patent shall cover, by suitable expression in the appended claims, whatever features of patentable novelty exist in the invention disclosed.

Having described a specific preferred embodiment of the invention, the following is claimed 1. A furnace comprising a plurality of longitudinally extending burners for use in burning fuel to form hot combustion gases which rise upwardly along the length of said burners, and a plurality of generally upright heat exchange enclosures having sidewalls which form upwardly extending combustion gas chambers for receiving hot combustion gases from each of said burners, said sidewalls of said heat exchange enclosures being disposed in a side-by-side relationship with space between outer side surfaces of said sidewalls to form a plurality of spaced apart flow paths for air to be heated by exposure to outer side surfaces of said sidewalls, each of said burners being partially enclosed by each of said heat exchange enclosures to enable each of said heat exchange enclosures to conduct hot combustion gases upwardly from each of said burners to heat said sidewalls of each of said heat exchange enclosures, each of said burners having a longitudinal central axis which extends transversely to the sidewalls of said heat exchange enclosures and extends through each of the combustion gas chambers.

2. A furnace as set forth in claim 1 wherein a generally upright plane extends through lower and upper end portions of each of the combustion gas chambers, the longitudinal axes of each of said burners extending perpendicular to the upright planes through the lower and upper end portions of each of the combustion gas chambers 3. A furnace as set forth in claim 1 wherein at least some of said sidewalls include surface means for defining a plurality of openings, each of said burners extending through openings formed in a plurality of said sidewalls.

4. A furnace as set forth in claim 1 further including a face plate connected with an end portion of each of said enclosures, the longitudinal central axes of said burners extending parallel to a major side surface of said face plate.

5. A furnace as set forth in claim 1 further including a plurality of longitudinally extending diverters disposed above and extending parallel to said burners, each of said diverters being partially enclosed by each of said heat exchange enclosures to enable each of said diverters to divert the flow of hot combustion gases in each of the combustion gas chambers in said plurality of heat exchange enclosures.

6. A furnace as set forth in claim 1 further including a plurality of longitudinally extending baffles disposed adjacent to upper end portions of said heat exchange enclosures in the flow paths for air to be heated by exposure to outer side surfaces of said sidewalls, said baffles having lengths which are at least substantially as long as longitudinal dimensions of upper end portions of the flow paths for air to be heated by exposure to outer side surfaces of said sidewalls.

7. A furnace as set forth in claim 6 wherein said baffles have longitudinal axes which are disposed above and extend perpendicular to longitudinal axes of said burners.

8. A furnace as set forth in claim 1 wherein all of the heat exchange enclosures being connected by a common face plate, said common face plate includes upper and lower halves, each half having mating C-section edges.

9. A furnace as set forth in claim 8 wherein the longitudinal axes of said burners extend parallel to said common face plate.

10. The furnace of claim 1 further including:
 (a) a filter compartment through which return air is drawn and filtered before it is forced through the flow paths between said heat exchange enclosures;
 (b) a flue gas pipe through which combustion gases are discharged from the furnace to the outside atmosphere; and
 (c) a conduit for communicating heated air with areas to be warmed.

11. The furnace of claim 10 additionally including a means for measuring differential pressure between the atmosphere and the inside of the filter compartment.

12. The furnace of claim 11, wherein the means for measuring differential pressure is a U-shaped, fluid filled manometer.

13. The furnace of claim 1 further including a fuel line to said burners, a bypass line for providing fuel during times of power failure, a first valve for manually controlling the flow of fuel in said bypass line, a second normally closed solenoid-operated valve which is automatically opened upon power failure, a third, manually controlled valve in the fuel line for controlling fuel flow, and, means in the fuel line for regulating fuel flow in response to discharge gas temperature.

14. The furnace of claim 13, additionally including a battery-powered lightweight blower fan adapted to replace an existing blower fan in the event of power failure.

15. The furnace of claim 1 further including means for providing a flow of air to be heated, said means for providing a flow of air to be heated including blower means for urging air to be heated toward the outer side surfaces of said sidewalls, said blower means including:
 (a) a fan;
 (b) a first pulley connected to the fan;
 (c) a motor for rotating the fan;
 (d) a second pulley connected to the motor;
 (e) a drive belt connecting the first and second pulleys; and
 (f) means for tensioning the drive belt in response to wear.

16. The furnace as set forth in claim 15 wherein the means for tensioning the drive belt includes an idler pulley located intermediate the first and second pulleys, the idler pulley including a spring for urging the idler pulley against the drive belt.

17. The furnace of claim 15 additionally comprising means for varying the speed of the fan in response to temperature.

18. The fuel burning furnace of claim 15 wherein the second pulley includes:
 (a) two identical halves which define a groove in which the drive belt rides;
 (b) an inner spring located between the two halves for urging the halves apart;
 (c) a pair of outer springs disposed on outer portions of the halves, the outer spring having a greater coefficient of expansion than the inner spring so that, as ambient temperature rises, the pulley halves are urged together to fore the drive belt to a location on the outer periphery of the pulley.

19. The furnace of claim 1 further including a trough for containing water, a water inlet for supplying water to the trough to a predetermined level, an A-shaped frame disposed above the trough, the frame having water absorbing, removable side panels which are in water-absorbing relation with the water in the trough and means for conducting air heated by said sidewalls through the panels to cause the water to evaporate.

20. The furnace of claim 19, additionally comprising condensing coils located at adjacent sides of the A-frame and a water drain in the bottom of the trough, city or well water being circulated through the coils, the coils being exposed by removing the side panels so that water vapor passing over the coils will condense on the coils and will be collected in the trough and drained, thus decreasing the water vapor content of the ambient air.

21. In a furnace, the combination comprising:
 (a) a burner for burning combustible fuel to produce hot combustion gases; and
 (b) a heat exchanger including:
  (i) a generally rectangular enclosure, said generally rectangular enclosure having interior surfaces of the enclosure in heat exchange relation with the hot combustion gases, and the exterior surfaces of the enclosure being in heat exchange relation with air to be heated; and
 (c) means disposed within the enclosure for urging the hot combustion gases toward the interior surfaces of the enclosure to maximize the heat transfer, said means for urging hot combustion gases toward the interior surfaces of the heat exchange enclosure includes a longitudinally extending baffle plate disposed between the interior surfaces of the enclosure and a V-shaped baffle, said V-shaped baffle being disposed at the upper end of said baffle plate to direct the hot combustion gases toward the interior surfaces of the enclosure after combustion.

22. In a furnace as set forth in claim 1 wherein said burner has a longitudinally extending central axis, said V-shaped baffle having a longitudinally extending axis which is parallel to the longitudinally extending central axis of said burner.

23. In a furnace as set forth in claim 1 wherein said interior surfaces of the enclosure are disposed on side walls which form an upwardly extending combustion gas chamber for receiving hot combustion gas from said burner means, said side walls being disposed in a sideby-side relationship with space between said interior surfaces, said baffle plate being disposed between said side walls to from a pair of spaced apart flow paths disposed on opposite sides of said baffle plate for hot combustion gases from said burner.

24. In a furnace as set forth in claim 23 wherein said V-shaped baffle is disposed between said side walls to deflect flows of combustion gases on opposite sides of said baffle plate toward said side walls.

25. In a furnace as set forth in claim 21 wherein said V-shaped baffle includes a pair of side plates which intersect at an apex portion of said V-shaped baffle, said apex portion of said V-shaped baffle being connected with an upper end of said baffle plate.

26. In a furnace as set forth in claim 21 wherein said burner means includes a longitudinally extending burner for use in burning fuel to form hot combustion gases which rise upwardly along the length of said burner, said enclosure including sidewalls which form an upwardly extending combustion gas chamber for receiving hot combustion gases from said burner, said sidewalls of said heat exchange enclosure having outer side surface which partially define a plurality of spaced apart flow paths for air to be heated by exposure to outer side surfaces of said sidewalls, said burner being at least partially enclosed by said heat exchange enclosure to enable said heat exchange enclosure to conduct hot combustion gases upwardly from said burner to heat said sidewalls of said heat exchange enclosure.

27. A furnace as set forth in claim 21 wherein a longitudinal axis of said burner extends parallel to said baffle plate.

28. A furnace as set forth in claim 21 wherein said baffle plate and said V-shaped baffle have longitudinal axes which are disposed above and extend parallel to a longitudinal axis of said burner.

29. A furnace as set forth in claim 21 further including:
 (a) a filter compartment through which return air is drawn and filtered;
 (b) a flue gas pipe through which combustion gases are discharged from the furnace to the outside atmosphere; and
 (c) a conduit for communicating heated air with areas to be warmed.

30. The furnace of claim 29 additionally including a means for measuring differential pressure between the atmosphere and the inside of the filter compartment.

31. The furnace of claim 30, wherein the means for measuring differential pressure is a U-shaped, fluid filled manometer.

32. The furnace of claim 21 further including a fuel line to said burner, a bypass line for providing fuel during times of power failure, a first valve for manually controlling the flow of fuel in said bypass line, a second normally closed solenoid-operated valve which is automatically opened upon power failure, a third, manually controlled valve in the fuel line for controlling fuel flow, and, means in the fuel line for regulating fuel flow in response to discharge gas temperature.

33. The furnace of claim 32, additionally including a battery-powered lightweight blower fan adapted to replace an existing blower fan in the event of power failure.

34. The furnace of claim 21 further including means for providing a flow of air to be heated, said means for providing a flow of air to be heated including blower means for urging air to be heated toward the outer side surface of said enclosure, said blower means including:
 (a) a fan;
 (b) a first pulley connected to the fan;
 (c) a motor for rotating the fan;
 (d) a second pulley connected to the motor;
 (e) a drive belt connecting the first and second pulleys; and
 (f) means for tensioning the drive belt in response to wear.

35. The furnace as set forth in claim 34 wherein the means for tensioning the drive belt includes an idler pulley located intermediate the first and second pulleys, the idler pulley including a spring for urging the idler pulley against the drive belt.

36. The furnace of claim 34 additionally comprising means for varying the speed of the fan in response to temperature.

37. The fuel burning furnace of claim 34 wherein the second pulley includes:
 (a) two identical halves which define a groove in which the drive belt rides;
 (b) an inner spring located between the two halves for urging the halve apart;
 (c) a pair of outer springs disposed on outer portions of the halves, the outer spring having a greater coefficient of expansion than the inner spring so that, as ambient temperature rises, the pulley halves are urged together to fore the drive belt to a location on the outer periphery of the pulley.

38. The furnace of claim 21 further including a trough for containing water, a water inlet for supplying water to the trough to a predetermined level, an A-shaped frame disposed above the trough, the frame having water absorbing, removable side panels which are in water-absorbing relation with the water in the trough and means for conducting air heated by said sidewalls through the panels to cause the water to evaporate.

39. The furnace of claim 38 additionally comprising condensing coils located at adjacent sides of the A-frame and a water drain in the bottom of the trough, city or well water being circulated through the coils, the coils being exposed by removing the side panels so that water vapor passing over the coils will condense on the coils and will be collected in the trough and drained, thus decreasing the water vapor content of the ambient air.

* * * * *

UNITED STATES PATENT AND TRADEMARK OFFICE
CERTIFICATE OF CORRECTION

PATENT NO. : 4,987,881
DATED : January 29, 1991
INVENTOR(S) : Rajendra K. Narang It is certified that error appears in the above-identified patent and that said Letters Patent is hereby corrected as shown below:

Column 14, Line 55, Claim 2, insert --.--after "bers".
Column 16, Line 59, Claim 22, change "1" to --21--.
Column 16, Line 64, Claim 23, change "1" to --21--.

Column 17, Line 3, Claim 23, change "from" to --form--.

Signed and Sealed this

Seventh Day of July, 1992

Attest:

DOUGLAS B. COMER

*Attesting Officer*    Acting Commissioner of Patents and Trademarks